US011161383B1

(12) United States Patent
Saylor et al.

(10) Patent No.: US 11,161,383 B1
(45) Date of Patent: Nov. 2, 2021

(54) PROCESS AND SYSTEM FOR CORRECTING LONGITUDINAL ROLL FROM OFFSET LOAD USING ACTIVE ROLL CONTROL

(71) Applicant: GM GLOBAL TECHNOLOGY OPERATIONS LLC, Detroit, MI (US)

(72) Inventors: Brian K. Saylor, South Lyon, MI (US); Larry G. Gepfrey, Fenton, MI (US); Adam D. Stanton, Farmington Hills, MI (US); Robert G. Izak, Dryden, MI (US); Bo Yu, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 26 days.

(21) Appl. No.: 16/863,828

(22) Filed: Apr. 30, 2020

(51) Int. Cl.
| | |
|---|---|
| *B60G 17/015* | (2006.01) |
| *B60G 17/052* | (2006.01) |
| *B60G 21/055* | (2006.01) |
| *B60G 17/016* | (2006.01) |

(52) U.S. Cl.
CPC ..... *B60G 17/0155* (2013.01); *B60G 17/0162* (2013.01); *B60G 17/052* (2013.01); *B60G 21/0555* (2013.01); *B60G 2202/1351* (2013.01); *B60G 2202/152* (2013.01); *B60G 2202/42* (2013.01); *B60G 2500/30* (2013.01); *B60G 2800/012* (2013.01)

(58) Field of Classification Search
CPC .............. B60G 17/0155; B60G 17/052; B60G 17/0162; B60G 21/0555; B60G 2202/152; B60G 2500/30; B60G 2202/1351; B60G 2800/012; B60G 17/017; B60G 2800/01
See application file for complete search history.

(56) References Cited

U.S. PATENT DOCUMENTS 6,217,047 B1 * 4/2001 Heyring .................. B60G 9/02
280/124.106
6,428,024 B1 * 8/2002 Heyring ............. B60G 21/0555
280/124.1

(Continued)

FOREIGN PATENT DOCUMENTS

| | | | |
|---|---|---|---|
| CN | 108773254 A | * 11/2018 | |
| DE | 102007006034 A1 | * 8/2008 | ......... B60G 17/0162 |

(Continued)

*Primary Examiner* — James A English
*Assistant Examiner* — Kurtis Nielson
(74) *Attorney, Agent, or Firm* — Quinn IP Law

(57) ABSTRACT

A process for correcting longitudinal roll from an offset load using active roll control within a vehicle is provided. The process includes, within a computerized controller using axle-based control to control a suspension system, operating programming to control pneumatic pressure supplied to each of a plurality of air spring devices within the suspension system to execute a vehicle leveling event including one of adjusting a height of the vehicle or maintaining the height of the vehicle. The process further includes operating programming to, simultaneously with the controlling the pneumatic pressure, utilize a plurality of active sway bars to provide an offset torque to the vehicle body. Each of the plurality of active sway bars is associated with one of a plurality of axles. Providing the offset torque is based upon a number of moles of air in each of the plurality of air spring devices and reducing the longitudinal roll.

18 Claims, 4 Drawing Sheets

(56) References Cited

U.S. PATENT DOCUMENTS

| | | | | |
|---|---|---|---|---|
| 6,491,307 B1 * | 12/2002 | Charzinski | ............ | B60G 17/015 |
| | | | | 280/5.506 |
| 8,256,775 B2 * | 9/2012 | Kesselgruber | ..... | B60G 21/0555 |
| | | | | 280/5.503 |
| 10,266,028 B2 * | 4/2019 | Mettrick | ............ | B60G 17/0162 |
| 2002/0190486 A1 * | 12/2002 | Phillis | ................ | B60G 21/05 |
| | | | | 280/6.157 |
| 2003/0075883 A1 * | 4/2003 | Jin | ................ | B60G 17/052 |
| | | | | 280/5.508 |
| 2004/0245732 A1 * | 12/2004 | Kotulla | ............ | B60G 21/0555 |
| | | | | 280/5.502 |
| 2020/0047580 A1 * | 2/2020 | Coombs | ............ | B60G 17/0523 |
| 2020/0114721 A1 * | 4/2020 | Tanzan | ............... | B60G 17/0162 |

FOREIGN PATENT DOCUMENTS

| | | | | |
|---|---|---|---|---|
| WO | WO-2005123426 A1 * | 12/2005 | ......... | B60G 17/0185 |
| WO | WO-2006107080 A1 * | 10/2006 | ......... | B60G 17/0155 |
| WO | WO-2010122418 A1 * | 10/2010 | ............ | B60G 17/08 |

\* cited by examiner

PROCESS AND SYSTEM FOR CORRECTING LONGITUDINAL ROLL FROM OFFSET LOAD USING ACTIVE ROLL CONTROL

INTRODUCTION

The disclosure generally relates to a process and system for correcting roll from offset load using active roll control in a vehicle.

A vehicle suspension system supplies roll stiffness to an attached vehicle body. Springs within the vehicle suspension system include a spring force, which increases as compression or extension of the spring increases. Sway bars are utilized to transfer torque from a left wheel to a right wheel or vice versa.

SUMMARY

A process for correcting longitudinal roll from an offset load using active roll control within a vehicle is provided. The process includes, within a computerized controller using axle-based control to control a vehicle suspension system, operating programming to control pneumatic pressure supplied to each of a plurality of air spring devices within the vehicle suspension system to execute a vehicle leveling event including one of adjusting a height of the vehicle or maintaining the height of the vehicle. The process further includes operating programming to, simultaneously with the controlling the pneumatic pressure, utilize a plurality of active sway bars to provide an offset torque to a vehicle body. Each of the plurality of active sway bars is associated with one of a plurality of axles. Providing the offset torque is based upon taking into account a number of moles of air in each of the plurality of air spring devices and reducing the longitudinal roll.

In some embodiments, providing the offset torque is based upon equalizing the number of moles of air within each of the air spring devices.

In some embodiments, the vehicle includes an electric vehicle, and the longitudinal roll is operable to reduce current draw in the active sway bars and increase an operational range of the electric vehicle.

In some embodiments, the process further includes detecting a static offset roll, and executing the vehicle leveling event is based upon detecting the static offset roll.

In some embodiments, controlling the pneumatic pressure supplied to each of the plurality of air spring devices and utilizing the plurality of active sway bars to provide the offset torque to the vehicle body are performed to one of the plurality of axles at a time.

In some embodiments, utilizing the plurality of active sway bars to provide the offset torque to the vehicle body performed to one of the plurality of axles at the time includes iteratively adjusting each of the plurality of axles in a back and forth manner.

In some embodiments, the plurality of active sway bars includes a first sway bar associated with a front axle of the vehicle, and wherein the plurality of active sway bars further includes a second sway bar associated with a rear axle of the vehicle.

In some embodiments, controlling the pneumatic pressure supplied to each of the plurality of air spring devices and utilizing the plurality of active sway bars to provide the offset torque to the vehicle body are performed initially for the front axle and subsequently for the rear axle.

In some embodiments, controlling the pneumatic pressure supplied to each of the plurality of air spring devices and utilizing the plurality of active sway bars to provide the offset torque to the vehicle body are performed initially for the rear axle and subsequently for the front axle.

According to one alternative embodiment, a process for correcting longitudinal roll from offset load using active roll control within a vehicle is provided. The process includes, within a computerized controller using axle-based control to control a vehicle suspension system, operating programming to control pneumatic pressure supplied to each of a plurality of air spring devices within the vehicle suspension system to execute a vehicle leveling event including one of adjusting a height of the vehicle or maintaining the height of the vehicle. The process further includes operating programming to, simultaneously with the controlling of the pneumatic pressure, utilize a plurality of active sway bars to provide an offset torque to a vehicle body of the vehicle. Each of the plurality of active sway bars is associated with one of a plurality of axles. Providing the offset torque is based upon reducing the longitudinal roll and equalizing a number of moles of air in each of the plurality of air spring devices.

In some embodiments, the vehicle includes an electric vehicle, and reducing the longitudinal roll is operable to reduce current draw in the active sway bars and increase an operational range of the electric vehicle.

In some embodiments, the process further includes detecting a static offset roll, and executing the vehicle leveling event is based upon detecting the static offset roll.

In some embodiments, controlling the pneumatic pressure supplied to each of the plurality of air spring devices and utilizing the plurality of active sway bars to provide the offset torque to the vehicle body are performed on one of the plurality of axles at a time.

According to one alternative embodiment, a system for correcting longitudinal roll from an offset load using active roll control within a vehicle is provided. The system includes a vehicle suspension system. The vehicle suspension system includes a plurality of axles, two wheels for each of the axles, a plurality of air spring devices, wherein each of the air spring devices is associated with a corresponding one of the wheels, and a plurality of active sway bars, wherein each of the active sway bars is associated with a corresponding one of the axles. The system further includes a computerized controller using axle-based control to control a vehicle suspension system. The computerized controller operates programming to control pneumatic pressure supplied to each of the plurality of air spring devices within the vehicle suspension system to execute a vehicle leveling event including one of adjusting a height of the vehicle or maintaining the height of the vehicle. The computerized controller further operates programming to, simultaneously with the controlling the pneumatic pressure, utilize the active sway bars to provide an offset torque to a vehicle body of the vehicle. Providing the offset torque is based upon taking into account a number of moles of air in each of the plurality of air spring devices and reducing the longitudinal roll.

In some embodiments, the computerized controller further operates programming to provide the offset torque based upon equalizing the number of moles of air within each of the air spring devices.

In some embodiments, the vehicle includes an electric vehicle, and the computerized controller operating programming to reduce the longitudinal roll is operable to reduce current draw in the plurality of active sway bars and increase an operational range of the electric vehicle.

In some embodiments, the computerized controller further operates programming to detect a static offset roll, and executing the vehicle leveling event is based upon detecting the static offset roll.

In some embodiments, the computerized controller operating programming to control the pneumatic pressure supplied to each of the plurality of air spring devices and utilize the plurality of active sway bars to provide the offset torque to the vehicle body are performed to one of the plurality of axles at a time.

The above features and advantages and other features and advantages of the present disclosure are readily apparent from the following detailed description of the best modes for carrying out the disclosure when taken in connection with the accompanying drawings.

DETAILED DESCRIPTION

Figure 1:
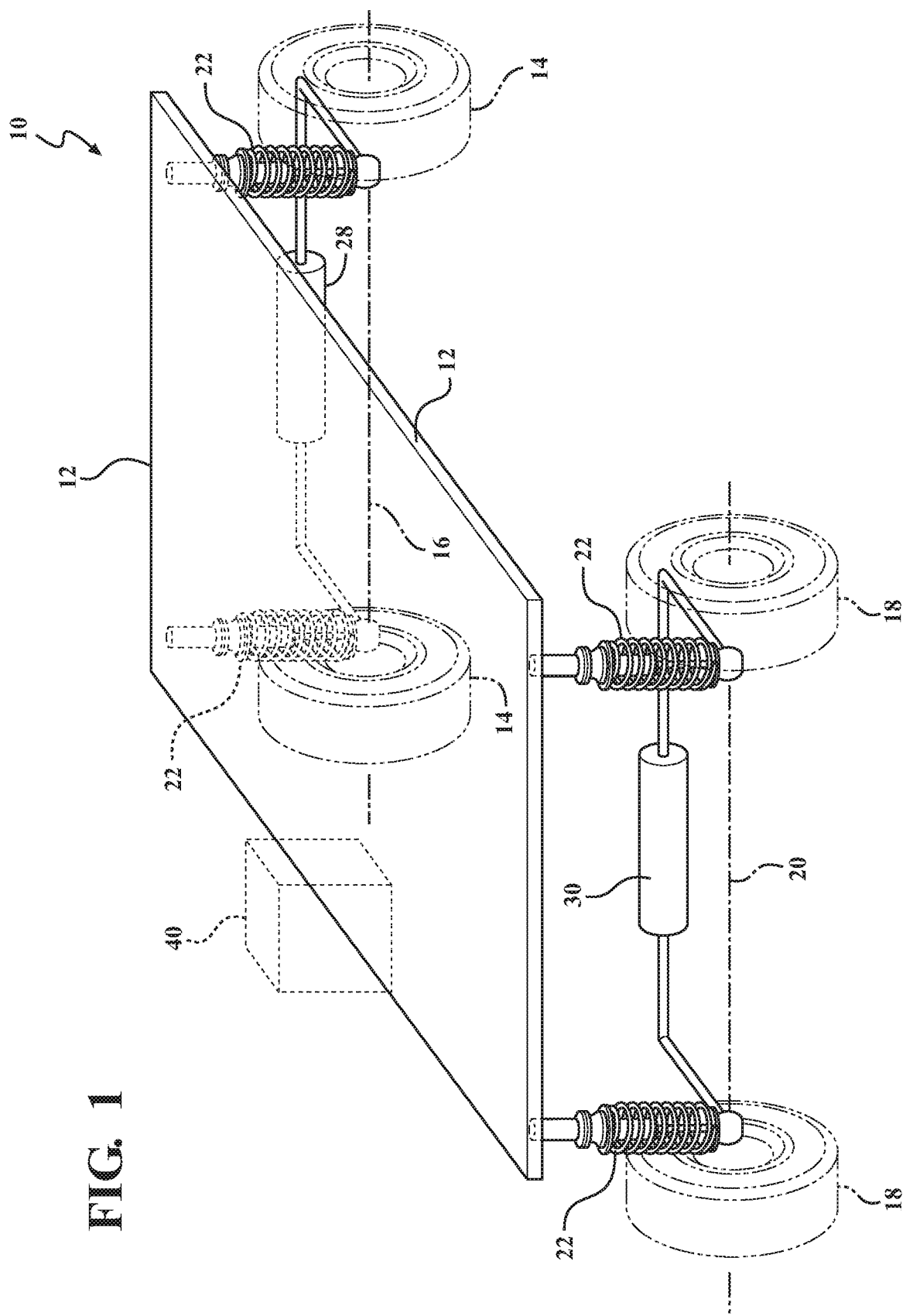
FIG. 1 schematically illustrates an exemplary vehicle including air springs at each wheel and an ARC system, including a computerized controller operable to control vehicle longitudinal roll through a leveling event, in accordance with the present disclosure.

Vehicle suspension systems may utilize air springs located at each wheel to provide an adjustable or tunable spring portion of a spring/damper component. According to one operation that may be achieved through adjustable air springs, the vehicle suspension system may execute a leveling event or may adjust a level of the vehicle body. The vehicle leveling event describes changing, adjusting, or maintaining the nominal height of the vehicle body with respect to a ground surface or of the vehicle with respect to the ground surface. Maintaining the height of the vehicle body may include, for example, adjusting suspension control for an increased or increasing load upon the vehicle. It may be a goal of the vehicle suspension system to maintain the body in a parallel or zero degree roll state with respect to the ground during and after such a leveling event, but as described herein, a leveling event is an operation to adjust or maintain a height of the vehicle body.

In one embodiment of controlling the air springs located at each wheel of a vehicle, each of the air springs may have an individualized control. Such a system may be described as a four corner independent air leveling system. While such a system provides increased flexibility in terms of being able to individually adjust spring properties in each of the air springs, such a system has a number of drawbacks. In order to keep the steering response and handling performance of the vehicle symmetrical in left and right turns it is undesirable to have more of the weight of the vehicle to be carried on one diagonal when compared to its opposite. This phenomenon is independent of the vehicle loading condition. With specific respect to a leveling event, utilizing individualized control of each of the four air springs when the vehicle has an offset load or a weight applied within the body of the vehicle, at a position offset from a center of gravity of the vehicle body, may be utilized to both change a nominal height of the vehicle body and to offset a roll angle caused by the offset load. However, in providing different pneumatic pressures to each air spring (i.e., creating different air masses or number of moles in each air spring,) the spring properties of each of the air springs is affected. These different spring properties acting on each of the wheels of the vehicle may adversely affect dynamic operation of the vehicle suspension system, for example, adversely impacting the symmetrical left and right steering response and handling performance. Additionally, individual control would require a more complex control logic.

In another embodiment, a vehicle suspension system may utilize axle-based control process, wherein, the air suspension acting upon a single axle at a time, an active roll control (ARC) system may increase its effective stiffness on that single axle to compensate for loss of roll stiffness from the active air leveling system. The disclosure provides a process and system for use with a vehicle suspension system utilizing an axle-based control process. In utilizing an axle based leveling system maintaining the same air spring properties left and right becomes simple if the vehicle doesn't have a roll angle. The control logic to utilize 4 corner independent leveling system with a variable roll angle is theoretically possible but a lot more complicated.

Roll stiffness describes an ability of a spring component in a vehicle suspension system to resist longitudinal roll of a connected vehicle body. A vehicle suspension system may have a plurality of roll stiffness contributors. A first roll stiffness contributor may include an air spring located at each wheel. An air spring may utilize pneumatic pressure to adjust force applied by the air spring. Through computerized control over the pneumatic pressure, the air springs may be adjusted to achieve various control processes for the vehicle. For example, ride and handling characteristics of the vehicle may be adjusted. In another example, in a leveling operation, pneumatic pressure may be adjusted in all of the springs to change a level to which the vehicle body attached to the vehicle suspension system is lifted. A computerized system utilized to control leveling of the vehicle body through control of the air springs may be described as a vehicle leveling system. However, in a leveling event achieved through only adjustment of air pressure provided to each of the air springs, roll stiffness control through the air springs may be lost. Unequal air mass or moles may be applied to each of the air springs, and this unequal mass of air may compromise the resulting spring stiffness or response of the air springs to force inputs. Offset loading of the vehicle or placing a load within the vehicle that is not centered left to right may generate additional roll during leveling event. This causes disproportionate air pressure and air volume within the air springs. This allows the vehicle to roll further during the leveling active event, even without further load shift. After uncontrolled leveling event, vehicle remains at new offset static roll angle until next leveling event. Upon operation of a next leveling event, the offset static roll angle may compound and get worse.

A second roll stiffness contributor may come from a stabilizer bar. A stabilizer bar may be provided for each axle and may be connected between each wheel at each axle. The stabilizer bars may be an active anti-roll bar or an active sway bar. An active sway bar may include an electric actuator capable of providing a specific amount of torque to the suspension via the active sway bar. Applying electrical power to the electric actuator of the active sway bar causes a torque to be applied to the body of the vehicle attached to the vehicle suspension system and may be utilized to adjust a roll angle of the vehicle body with respect to the vehicle suspension system and a ground surface. A computerized system utilized to control roll of the vehicle body through control of one or more active sway bars may be described as an ARC system.

The disclosed process and system is useful to counter effects of disproportionate roll when a vehicle utilizes coordinated control of air springs and an ARC system to level the vehicle body. The ARC system will apply an additional offset torque during a leveling event to bring the vehicle closer to level roll during a trim height leveling adjustment. The process would improve a center of gravity level between right and left and resist additional roll during leveling events. According to one embodiment of the disclosure, the disclosed process may include maintaining as equal of air mass or moles of air as possible in each of the air springs and utilizing the active sway bars to compensate for offset load.

Air springs may be used to enact suspension leveling including changing height. In a vehicle system including air springs and an ARC system, wherein the two systems are not utilized according to the disclosed process, a significant static roll of the vehicle body may result. In attempting to compensate for this static roll, the ARC system may energize the electric actuator of one or both active sway bars to overcome the static roll caused by the air springs. This energized actuator consumes electrical energy. In particular, in vehicles that utilize electric energy to propel the vehicle, this drain on electrical energy to attempt to overcome the static roll caused by the air springs may reduce the travel range of the vehicle. By utilizing the disclosed process, with control of the ARC system interacting with control of the air springs, reduced longitudinal roll of the vehicle body may result in improved ride and handling as compared to a system simply utilizing the air springs. Further, range of a vehicle utilizing electrical energy to propel the vehicle, such as an electric vehicle, may be increased.

Sway bars transmit torque within a vehicle or provide roll stiffness to the vehicle suspension system to control longitudinal roll of the vehicle body. Additionally, one form of sway bar described as a passive sway bars exhibit torsional stiffness or resistance to being twisted along a longitudinal axis of the sway bar. A passive sway bar is typically a one-piece metal bar with a fixed geometry. A second form of sway bar described as an active sway bar and may use an electric motor to provide the desired torque determined by the control algorithm. An active sway bar does not require displacement to generate a torque. The electric motor provides a torque that is independent of the displacement and bar stiffness. Therefore, utilizing an active sway bar to provide the desired torque eliminates the need for any torsional stiffness within the sway bar and may improve ride quality and handling of the vehicle. The body rolls as a unit with respect to a flat ground surface. The roll moment of the front and rear axles are added together to obtain a total roll moment being applied on the body.

In programing to control and coordinate the air springs and the ARC system, loads inherent to the vehicle such as an engine, fuel load, battery weight, and other similar loads may be taken into account.

Programming to control the disclosed leveling event may be operated based upon minimizing a roll angle or a measured displacement from a zero roll condition. As part of calibrating and controlling such a minimization of the roll angle, a monitored or estimated air mass or a number of moles of air in each of the air springs may be equalized or a difference between the moles of air may be brought below a threshold difference value. This control of the disclosed leveling event may be expressed as the control being based upon both the reducing the longitudinal roll angle and equalizing the number of moles of air within the plurality of air springs. Operating the leveling event based upon the estimated number of moles of air may include controlling the vehicle suspension system to have an equal estimated number of moles of air in each of the air springs. In another embodiment, operating the leveling event based upon the estimated number of moles of air may include controlling the vehicle suspension system to have number of moles of air within the air springs within a desired range of each other. If the air volume and air pressures are the same between the left and right sides the resulting number moles of air or air mass will be the same. According to one embodiment, a process goal or end result is to control the roll angle to keep the left and right air spring volumes equal. In one embodiment, pressures within the left and right air spring of an axle are equal based upon a process of leveling by axle.

Referring to the drawings, like reference numbers refer to similar components, wherever possible. FIG. 1 schematically illustrates a vehicle 10 including air springs at each wheel and an ARC system, including a computerized controller 40 operable to control vehicle longitudinal roll through a leveling event. Note that the vehicle 10 is shown highly schematically and is included only to illustrate basic principles of operation for a method of controlling and changing relative roll torque in the vehicle 10, or other vehicles.

The vehicle 10 includes a body 12 riding on two rear tires 14, which generally define a rear axle 16, and two front tires 18, which generally define a front axle 20. The body 12 is suspended by a plurality of suspension elements 22, which are shown schematically, and may each have one or more spring elements and one or more damper elements. Note that the suspension elements 22 are shown highly-schematically and are not representative of the entire suspension system. The suspension elements 22 each include an air spring device employing pneumatic pressure to modulate spring force applied within each of the suspension elements 22.

A rear active sway bar 28 varies roll moment of, or carried by, the rear axle 16, and a front active sway bar 30 varies roll moment of, or carried by, the front axle 20. Either of the sway bars may alternatively be referred to as an anti-roll bar, a roll bar, an anti-sway bar, a stabilizer bar, a torsion beam, or other terminology recognizable by skilled artisans. The rear active sway bar 28 and the front active sway bar 30 contain actuators and connect suspension points associated with the left and right tires relative to the rear axle 16 and the front axle 20 respectively. Note that many of the suspension elements 22 may also be active, and that the roll torque characteristics of the rear axle 16 and the front axle 20 may be affected by the active suspension elements 22, in addition to the rear active sway bar 28 and the front active sway bar 30.

A computerized controller 40 is operatively in communication with all necessary components of the vehicle 10. The computerized controller 40 includes a non-generalized, electronic control device having a preprogrammed digital computer or processor, a memory or non-transitory computer readable medium used to store data such as control logic, instructions, lookup tables, etc., and a plurality of input/output peripherals or ports. The computerized controller 40 is configured to implement or execute the control logic or instructions described herein.

Furthermore, the computerized controller 40 may include, or be in communication with, a plurality of sensors, such as those used to sense position, movement, and/or loading conditions of the vehicle 10. The computerized controller 40 may be dedicated to the specific aspects of the vehicle 10 described herein, or the computerized controller 40 may be part of a larger control system that manages numerous functions of the vehicle 10.

The drawings and figures presented herein are not to scale and are provided purely for instructional purposes. Thus, any specific or relative dimensions shown in the drawings are not to be construed as limiting. The vehicle 10 may be representative of any rolling platform, including, without limitation: motorcycles, tractors, buses, mobile homes, campers, and tracked vehicles. Furthermore, the components described herein may also be used in a variety of other industries and applications, including, without limitation: aerospace applications, consumer goods, industrial and construction equipment, farm equipment, or heavy machinery.

While the disclosure may be illustrated with respect to specific applications or industries, those skilled in the art will recognize the broader applicability of the disclosure. Those having ordinary skill in the art will recognize that terms such as "above," "below," "upward," "downward," et cetera, are used descriptively of the figures, and do not represent limitations on the scope of the disclosure, as defined by the appended claims. Any numerical designations, such as "first" or "second" are illustrative only and are not intended to limit the scope of the disclosure in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

When used herein, the term "substantially" refers to relationships that are ideally perfect or complete, but where manufacturing realties prevent absolute perfection. Therefore, substantially denotes typical variance from perfection. For example, if height A is substantially equal to height B, it may be preferred that the two heights are 100.0% equivalent, but manufacturing realities likely result in the distances varying from such perfection. Skilled artisans would recognize the amount of acceptable variance. For example, and without limitation, coverages, areas, or distances may generally be within 10% of perfection for substantial equivalence. Similarly, relative alignments, such as parallel or perpendicular, may generally be considered to be within 5%.

Lateral load transfer is the amount of change on the vertical loads of the tires due to the lateral acceleration imposed on the center of gravity (CG) of the vehicle 10. The lateral load transfer is affected by sway bars—in addition to other suspension components—which generally connect movement of the inside wheel to the outside wheel during a lateral maneuver, such as cornering or other evasive maneuvers.

Alternative vehicles may include passive, as opposed to active or adaptive, sway bars, which connect the wheels through a torsion spring. If the wheels move relative to each other, the passive sway bar is subjected to torsion and forced to twist. Each end of the passive sway bar is connected to an end link that connects to a spot near a wheel or the axle. As one wheel moves vertically relative to the other wheel on the same axle, the passive sway bar transfers part of the tire patch form from one side of a loaded axle to the opposite side.

Passive sway bars resist torsion through material stiffness, such that the torque required to twist passive sway bars cannot be altered, and the roll torque and stiffness of the front and rear axles is predetermined for such vehicles. The roll gradient provided by passive sway bars cannot be altered without changing the passive sway bars. Unlike a passive sway bar, where the axle torque from the passive sway bar is dependent on the wheel displacement, an active sway bar varies roll applies a roll moment to the axle using an actuator, and may allow fully independent movement of one tire relative to the other.

The total lateral load transfer is the summation of the lateral load transfer at the tire patch from the front axle 20 and the rear axle 16. Tire lateral load transfer distribution (TLLTD) is the ratio of the tire lateral load transfer handled by the front axle 20 to the total (summation of the front and rear axles.) The remaining amount (which may be expressed as one minus TLLTD) handled by the rear axle 16. Importantly, in the vehicle 10, the TLLTD can be adjusted by varying the roll torque outputs of the front active sway bar 30 and the rear active sway bar 28. Since the roll torque on the body of the vehicle 10 is the sum of the front and rear axle torques, it is possible to adjust the TLLTD without changing the vehicle's steady state roll angle in a turn. Varying or shifting the TLLTD alters the relative portion of the total roll torque, and therefore lateral load transfer, carried by the front active sway bar 30 and the rear active sway bar 28. Since each sway bar is only a portion of the total roll torque provided by the suspension on each axle, it is possible that the torque changes in the front active sway bar 30 and the rear active sway bar 28 will not be the same magnitude (but opposite in direction). It is also possible for one of the sway bars torques to be negative.

In the example of the vehicle 10, varying TLLTD varies the portion of the total roll torque handled by the front active sway bar 30 and the portion of the total roll torque handled by the rear active sway bar 28. For example, shifting the TLLTD toward the front (usually TLLTD greater than 50%) increases the torque carried by the front active sway bar 30 and decreases the torque carried by the rear active sway bar 28. Alternatively stated, increasing the torque carried by the front active sway bar 30 and decreasing the torque carried by the rear active sway bar 28 shifts the TLLTD forward. Vehicles having passive sway bars cannot alter the effects on TLLTD provided by the sway bars without changing the passive sway bars installed on the vehicle.

Additional torque during a leveling event reduces energy consumption by ARC with normal driving (less DC torque as from passive bar).

TLLTD may be maintained in desired or proper ratios during leveling events. According to one embodiment, such maintaining of the TLLTD may include leveling a single axle at a time. By adjusting a height of one axle at a time, the vehicle suspension system may maintain relatively stable control over the roll of the vehicle with the axle not being leveled while control over the axle being leveled is reduced. A controller may, during a leveling event, increase torsion control of the ARC system to compensate for temporary loss of roll control of the single axle being leveled. Increasing torsion control of the ARC system one axle at a time may include increasing its torque control iteratively, incrementally adjusting each axle in steps or in a back and forth manner to compensate each roll stiffness loss from the air suspension (i.e.; front, rear, front, rear, front, rear . . . ) Lowering and raising the vehicle can be done congruently if the correct total roll moment and front to rear split are applied to the bars. Similarly a torque ratio split between the front and rear axles could be applied to minimize the roll angle and maintain the proper TLLTD of the vehicle if both axles are being leveled at the same time.

Figure 2:
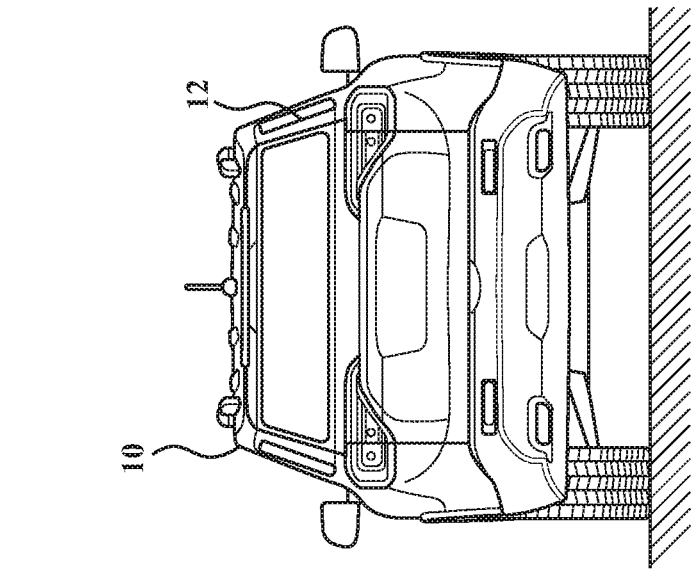
FIG. 2 schematically illustrates a rear view of the vehicle of FIG. 1 with no offset load, in accordance with the present disclosure.

FIG. 2 schematically illustrates a rear view of the vehicle 10 of FIG. 1 with no offset load. The vehicle 10 is illustrated including the vehicle body 12. The vehicle body 12 is illustrated in a level condition with zero or neutral longitudinal roll with respect to a level ground surface. Because there is no offset load applied to the vehicle, the suspension components of the vehicle 10 are able to maintain the vehicle with zero longitudinal roll.

Figure 3:
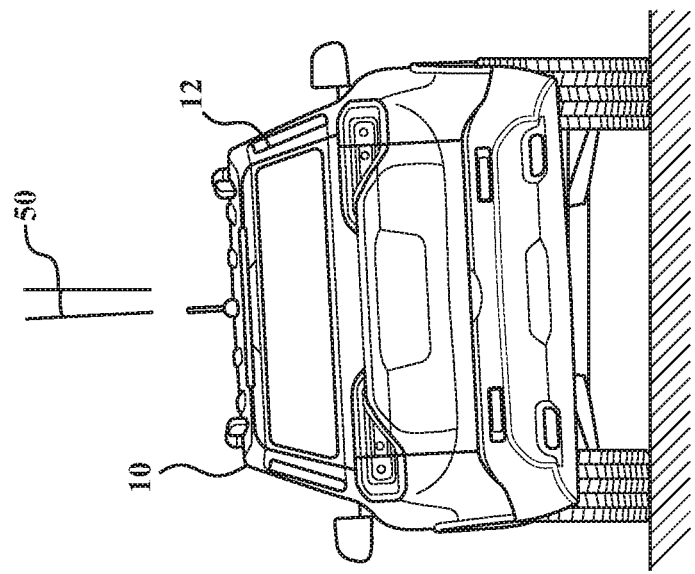
FIG. 3 schematically illustrates a rear view of the vehicle of FIG. 2 with an offset load resulting in vehicle roll to the left, in accordance with the present disclosure.

FIG. 3 schematically illustrates a rear view of the vehicle 10 of FIG. 2 with an offset load resulting in vehicle roll to the left. The vehicle 10 is illustrated including the vehicle body 12. An offset load is applied to a left side of the vehicle 10. The offset load may be a heavy weight, for example, a heavy object placed within a passenger compartment of the vehicle 10. As a result, a longitudinal roll angle 50 of the vehicle body 12 with respect to a level ground surface is apparent. The longitudinal roll angle 50 in one example may be a 3° roll. In the example provided, the offset load is applied to a left side of the vehicle. In other examples, the offset load may be applied to the right side of the vehicle with a similar longitudinal roll to the right side resulting. In the example provided, the offset load is applied to a point corresponding to a longitudinal center of gravity for the vehicle or is located at a position between a front edge of the vehicle 10 and a rear edge of the vehicle 10 at a point corresponding to a center of gravity for the vehicle (with the offset load offset to a left from the center of gravity.) In other examples, the offset load may be applied to a front or rear of the center of gravity of the vehicle, with a resulting front to rear vehicle roll resulting.

Figure 4:
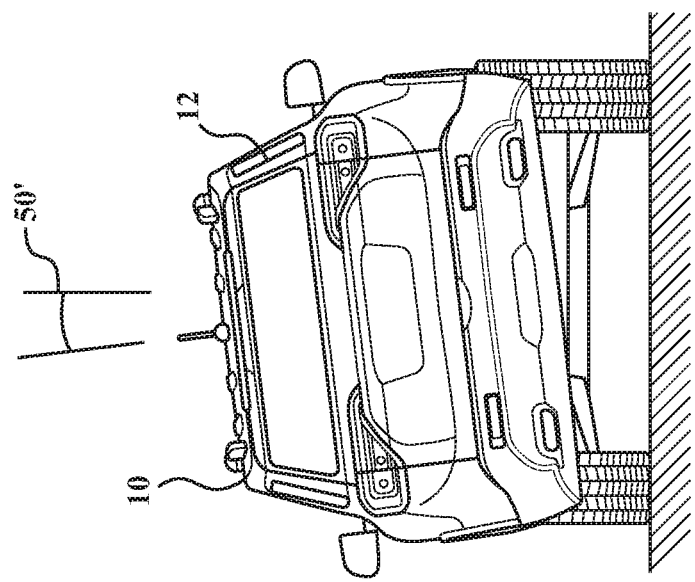
FIG. 4 schematically illustrates a rear view of the vehicle of FIG. 3 after a vehicle leveling event, with the computerized controller not providing coordinated control of the ARC system, in accordance with the present disclosure.

FIG. 4 schematically illustrates a rear view of the vehicle 10 of FIG. 3 after a vehicle leveling event, with the computerized controller 40 not providing coordinated computerized control of the ARC system. The vehicle 10 is illustrated including the vehicle body 12. An offset load remains applied to a left side of vehicle 10. Pneumatic control of the air springs in isolation, without coordinated control of the ARC system, results in an unequal mass of air being applied to and maintained within each of the air springs. As a result, an uncontrolled longitudinal roll angle 50' is illustrated. An uncontrolled longitudinal roll angle may include an exemplary 8° roll.

Figure 5:
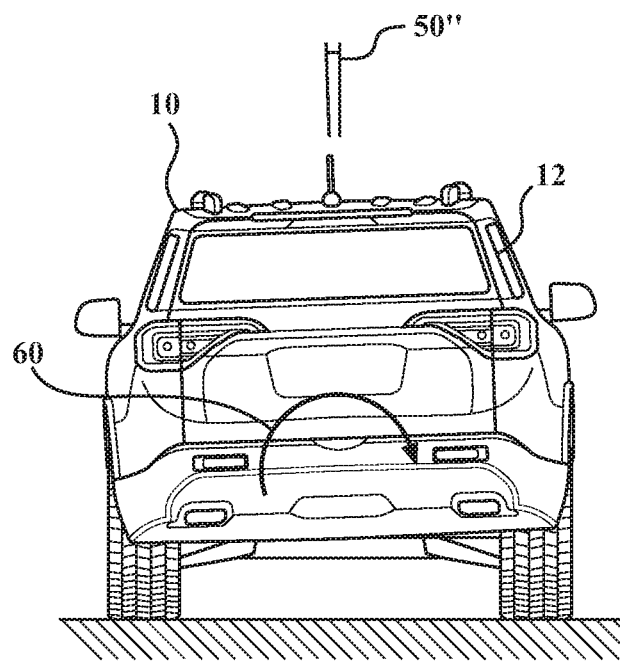
FIG. 5 schematically illustrates a rear view of the vehicle of FIG. 3 after a vehicle leveling event, with the computerized controller activated and providing control to the ARC system during the leveling event, with a resulting reduced longitudinal roll as compared to the vehicle of FIG. 4, in accordance with the present disclosure.

FIG. 5 schematically illustrates a rear view of the vehicle 10 of FIG. 3 after a vehicle leveling event, with the computerized controller 40 activated and providing control to the ARC system during the leveling event, with a resulting reduced longitudinal roll angle 50" as compared to the vehicle of FIG. 4. The vehicle 10 is illustrated including the vehicle body 12. A torque resulting from coordinated leveling of the vehicle 10 is illustrated by an arrow 60, which results in the reduced longitudinal roll angle 50". A reduced longitudinal roll angle may include an exemplary 1° roll.

Figure 6:
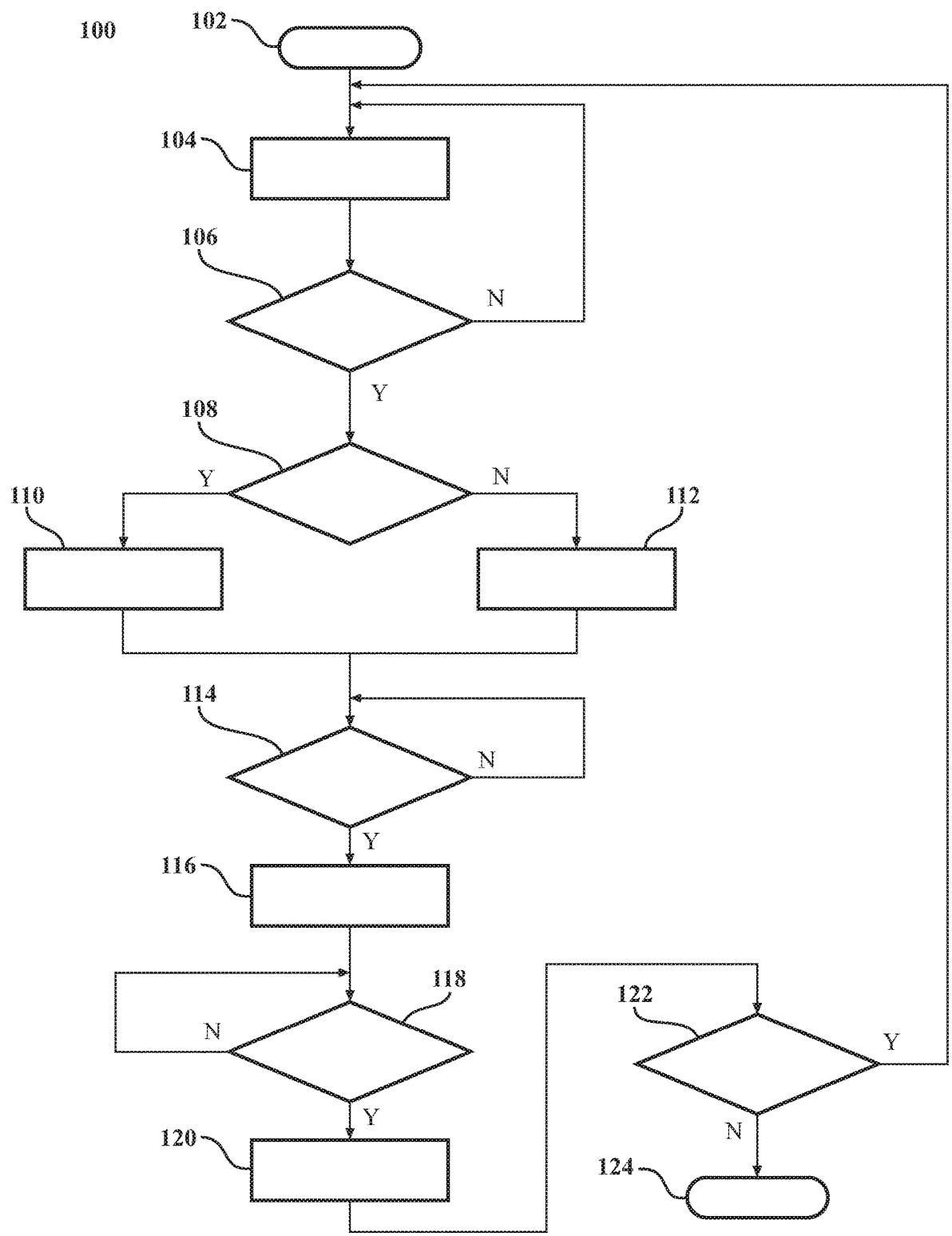
FIG. 6 is a flowchart illustrating an exemplary process for correcting roll from offset load using active roll control, in accordance with the present disclosure.

FIG. 6 is a flowchart illustrating an exemplary process 100 for correcting roll from an offset load using active roll control. The process 100 starts at step 102. At step 104, the vehicle is operating with normal ARC system roll stiffness. At step 106, sensor inputs are monitored and a determination is made whether a static offset roll is detected. If no static offset roll is detected, the process returns to step 104, where the vehicle continues to be operated under normal ARC system roll stiffness. If a static offset roll is detected, the process advances to step 108, where a determination is made whether a leveling event is needed or requested by a system within the vehicle. If no leveling event is needed or requested, the process advances to step 112, wherein a request is generated by the leveling system to the ARC system for cross flow without a vehicle leveling event. The vehicle suspension system may open necessary valves to allow for cross flow across an axle without providing or venting any air volume from the axle as a whole. i.e.; the right/left air springs are allowed to flow between each other, but not supplied by a pump or drained to exhaust for a vertical height change. If a leveling event is needed or requested, the process advances to step 110, where the leveling system requests an offset torque from the ARC system. At step 114, a determination is made whether the leveling system is active or open. If the leveling system is not open, the process reiterates at step 114 where the process waits for the next opening or activation of the leveling system corresponding with a start of a leveling event. If the leveling system is open, the process advances to step 116, where the ARC system applies the requested offset torque. At step 118, a determination is made whether the leveling system is closed or if the leveling event has ended. If the leveling event has not ended, the process reiterates at step 118 where it waits for the leveling event to end. If the leveling event has ended, at step 120, the ARC system decays the applied offset torque over time. At step 122, a determination is made whether the system remains active. If the vehicle remains active, the process returns to step 104. If the vehicle ceases to remain active, the process advances to step 124 where the process ends. The process 100 is provided as an exemplary embodiment of the disclosed process. A number of additional or alternative steps to the illustrated steps are envisioned, and the disclosure is not intended to be limited to the particular examples provided.

Figure 7:
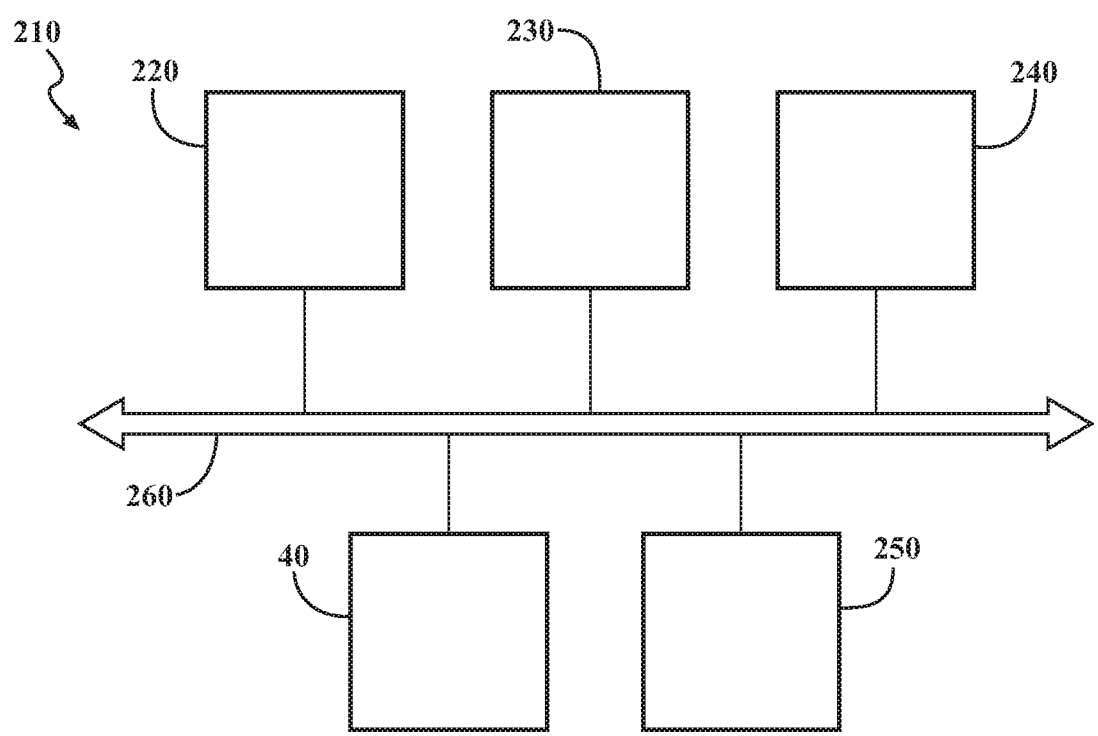
FIG. 7 schematically illustrates an exemplary vehicle communication architecture including a communications bus providing data and control between the computerized controller of FIG. 1 and other components of the vehicle, in accordance with the present disclosure.

FIG. 7 schematically illustrates an exemplary vehicle communication architecture 210 including a communications bus providing data and control between the computerized controller 40 of FIG. 1 and other components of the vehicle 40. The vehicle communication architecture 210 is illustrated including the computerized controller 40 in electronic communication with data bus device 260. Data bus device 260 is a communicative device used in the art to enable data transfer between various devices attached to the device. As illustrated, the data bus device 260 includes attached devices including a pneumatic air spring controller 220, a front axle active sway bar electric actuator 230, a rear axle active sway bar electric actuator 240, and vehicle suspension system sensors 250. The devices attached to data bus device 260 are exemplary.

The computerized controller 40 may include hardware and software operable to act as both a vehicle leveling system, controlling operation and adjustment of the air springs of the vehicle suspension system, and a controller for the ARC system. In other embodiments, a pair of computerized controllers 40 may be utilized to control the vehicle suspension system and the ARC system, with data bus device 260 providing communication between the two controllers.

While the best modes for carrying out the disclosure have been described in detail, those familiar with the art to which this disclosure relates will recognize various alternative designs and embodiments for practicing the disclosure within the scope of the appended claims.

What is claimed is:

1. A process for correcting longitudinal roll from an offset load using active roll control within a vehicle, comprising:
within a computerized controller using axle-based control to control a vehicle suspension system, operating programming to:
control pneumatic pressure supplied to each of a plurality of air spring devices within the vehicle suspension system to execute a vehicle leveling event including one of adjusting a height of the vehicle or maintaining the height of the vehicle; and
simultaneously with the controlling of the pneumatic pressure, utilize a plurality of active sway bars to provide an offset torque to a vehicle body of the vehicle, wherein each of the plurality of active sway bars is associated with one of a plurality of axles and wherein providing the offset torque is based upon a number of moles of air in each of the plurality of air spring devices and reducing the longitudinal roll.

2. The process of claim 1, wherein providing the offset torque is based upon equalizing the number of moles of air within each of the air spring devices.

3. The process of claim 1, wherein the vehicle includes an electric vehicle; and
wherein reducing the longitudinal roll is operable to reduce current draw in the active sway bars and increase an operational range of the electric vehicle.

4. The process of claim 1, further comprising detecting a static offset roll; and
wherein executing the vehicle leveling event is based upon detecting the static offset roll.

5. The process of claim 1, wherein controlling the pneumatic pressure supplied to each of the plurality of air spring devices and utilizing the plurality of active sway bars to provide the offset torque to the vehicle body are performed to one of the plurality of axles at a time.

6. The process of claim 5, wherein utilizing the plurality of active sway bars to provide the offset torque to the vehicle body performed to one of the plurality of axles at the time includes iteratively adjusting each of the plurality of axles in a back and forth manner.

7. The process of claim 1, wherein the plurality of active sway bars includes a first sway bar associated with a front axle of the vehicle; and
wherein the plurality of active sway bars further includes a second sway bar associated with a rear axle of the vehicle.

8. The process of claim 7, wherein controlling the pneumatic pressure supplied to each of the plurality of air spring devices and utilizing the plurality of active sway bars to provide the offset torque to the vehicle body are performed initially for the front axle and subsequently for the rear axle.

9. The process of claim 7, wherein controlling the pneumatic pressure supplied to each of the plurality of air spring devices and utilizing the plurality of active sway bars to provide the offset torque to the vehicle body are performed initially for the rear axle and subsequently for the front axle.

10. A process for correcting longitudinal roll from offset load using active roll control within a vehicle, comprising:
within a computerized controller using axle-based control to control a vehicle suspension system, operating programming to:
control pneumatic pressure supplied to each of a plurality of air spring devices within the vehicle suspension system to execute a vehicle leveling event including one of adjusting a height of the vehicle or maintaining the height of the vehicle; and
simultaneously with the controlling of the pneumatic pressure, utilize a plurality of active sway bars to provide an offset torque to a vehicle body of the vehicle, wherein each of the plurality of active sway bars is associated with one of a plurality of axles and wherein providing the offset torque is based upon reducing the longitudinal roll and equalizing a number of moles of air in each of the plurality of air spring devices.

11. The process of claim 10, wherein the vehicle includes an electric vehicle; and
wherein reducing the longitudinal roll is operable to reduce current draw in the active sway bars and increase an operational range of the electric vehicle.

12. The process of claim 10, further comprising detecting a static offset roll; and
wherein executing the vehicle leveling event is based upon detecting the static offset roll.

13. The process of claim 10, wherein controlling the pneumatic pressure supplied to each of the plurality of air spring devices and utilizing the plurality of active sway bars to provide the offset torque to the vehicle body are performed on one of the plurality of axles at a time.

14. A system for correcting longitudinal roll from an offset load using active roll control within a vehicle, comprising:
a vehicle suspension system including:
a plurality of axles;
two wheels for each of the axles;
a plurality of air spring devices, wherein each of the air spring devices is associated with a corresponding one of the wheels; and
a plurality of active sway bars, wherein each of the active sway bars is associated with a corresponding one of the axles;
a computerized controller using axle-based control to control the vehicle suspension system, the computerized controller operating programming to:
control pneumatic pressure supplied to each of the plurality of air spring devices within the vehicle suspension system to execute a vehicle leveling event including one of adjusting a height of the vehicle or maintaining the height of the vehicle; and
simultaneously with the controlling the pneumatic pressure, utilize the active sway bars to provide an offset torque to a vehicle body of the vehicle, wherein providing the offset torque is based upon a number of moles of air in each of the plurality of air spring devices and reducing the longitudinal roll.

15. The system of claim 14, wherein the computerized controller further operates programming to provide the offset torque based upon equalizing the number of moles of air within each of the air spring devices.

16. The system of claim 14, wherein the vehicle includes an electric vehicle; and
wherein the computerized controller operating programming to reduce the longitudinal roll is operable to reduce current draw in the plurality of active sway bars and increase an operational range of the electric vehicle.

17. The system of claim 14, wherein the computerized controller further operates programming to detect a static offset roll; and wherein executing the vehicle leveling event is based upon detecting the static offset roll.

18. The system of claim 14, wherein the computerized controller operating programming to control the pneumatic pressure supplied to each of the plurality of air spring devices and utilize the plurality of active sway bars to provide the offset torque to the vehicle body are performed to one of the plurality of axles at a time.

* * * * *